(12) United States Patent
Imai et al.

(10) Patent No.: US 6,369,977 B1
(45) Date of Patent: Apr. 9, 2002

(54) MAGNETIC DISK DEVICE

(75) Inventors: Satomitsu Imai, Odawara; Takashi Kouno, Niihari-gun; Marutomo Goto; Shigeo Nakamura, both of Odawara; Masahiko Sega, Hiratsuka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/769,362

(22) Filed: Jan. 26, 2001

(30) Foreign Application Priority Data

Sep. 29, 1999 (JP) ........................................ 2000-302836

(51) Int. Cl.$^7$ ............................................... G11B 17/02
(52) U.S. Cl. .................................. 360/97.02; 360/97.03; 360/97.04
(58) Field of Search ........................... 360/97.02, 99.05, 360/97.03, 97.04

(56) References Cited

U.S. PATENT DOCUMENTS

| | | | | |
|---|---|---|---|---|
| 4,725,904 A | * | 2/1988 | Dalziel ..................... | 360/78.13 |
| 5,636,082 A | * | 6/1997 | Shibuya et al. ........... | 360/97.02 |
| 6,054,833 A | * | 4/2000 | Takeuchi .................... | 318/638 |
| 6,125,003 A | * | 9/2000 | Tsuda et al. .............. | 360/97.03 |
| 6,208,484 B1 | * | 3/2001 | Voights .................... | 360/97.02 |

OTHER PUBLICATIONS

Patent Abstract of Japan Publication No. 2000–156068 Date Jun. 6, 2000.

* cited by examiner

Primary Examiner—Hoa T. Nguyen
Assistant Examiner—Dzung C. Nguyen
(74) Attorney, Agent, or Firm—Antonelli, Terry, Stout & Kraus, LLP

(57) ABSTRACT

Return channels 45a, 45b, 45c, and 50 are formed to guide air flowing through a clearance between a magnetic disk (11) and a shroud (41) so that the air flows behind a voice coil motor, bypasses a loading/unloading mechanism (31) and flows toward a region on the lower side of the loading/unloading mechanism 31 with respect to the rotating direction of the magnetic disk (11). Thus, production of turbulent flow in the vicinity of the loading/unloading mechanism 31 is controlled. Fluttering of the magnetic disk (11) can be controlled by placing a filter 60 in one of the return channels.

8 Claims, 5 Drawing Sheets

600

MAGNETIC DISK DEVICE

BACKGROUND OF THE INVENTION

The present invention relates to a magnetic disk device and, more particularly, to a magnetic disk drive which has a high reliability and is capable of reducing windage vibrations of a magnetic head due to turbulent air currents produced by a rotating magnetic disk.

FIG. 6 shows a known magnetic disk device 600 disclosed in JP-A No. 2000-156068. The magnetic disk device 600 drives a magnetic disk 11 by way of a spindle motor 12. A magnetic head for writing information to and reading information from the magnetic disk 11 is supported on the extremity of a suspension 21. A carriage arm 25 supports the suspension 21. The carriage arm 25 has a base end fixed to a pivot shaft 20. A voice coil motor 28 drives the carriage arm 25 for turning. This prior art magnetic disk device 600 is provided with a filter 60 placed on an air passage 61 formed by cutting a portion of a shroud 41.

SUMMARY OF THE INVENTION

The air passage 61 formed by cutting a portion of the shroud 41 as shown in FIG. 6 often enhances the hydrodynamic vibrations of the magnetic disk 11 generally called disk fluttering Accordingly, it is an object of the present invention to provide a magnetic disk device which has a high reliability and is capable of reducing windage vibrations of a magnetic head caused by air currents produced by a rotating magnetic disk.

With the foregoing object in view, according to a first aspect of the present invention, a magnetic disk device comprises a magnetic disk for recording information, a spindle motor for driving the magnetic disk for rotation, a magnetic head for writing information to and reading information from the magnetic disk, a carriage arm supporting the magnetic head, a voice coil motor for moving the carriage arm, a shroud forming a peripheral wall, a structure forming an air passage extending through a clearance between the voice coil motor and the shroud between a position on the upper side of the carriage arm with respect to the direction of rotation of the magnetic disk and a position on the lower side of the carriage arm with respect to the direction of rotation of the magnetic disk, and a filter placed in the air passage to clean air flowing through the air passage.

According to a second aspect of the present invention, a magnetic disk device comprises a magnetic disk for recording information, a spindle motor for driving the magnetic disk for rotation, a magnetic head for writing information to and reading information from the magnetic disk, a carriage arm supporting the magnetic head, a voice coil motor for moving the carriage arm, a loading/unloading mechanism for retracting the carriage arm from a position on the magnetic disk, a shroud forming a peripheral wall, and a structure forming an air passage extending through a clearance between the voice coil motor and the shroud between a position on the upper side of the carriage arm with respect to the direction of rotation of the magnetic disk and a position on the lower side of the carriage arm with respect to the direction of rotation of the magnetic disk.

According to a third aspect of the present invention, a magnetic disk device comprises a magnetic disk for recording information, a spindle motor for driving the magnetic disk for rotation, a magnetic head for writing information to and reading information from the magnetic disk, a carriage arm supporting the magnetic head, a voice coil motor for moving the carriage arm, a loading/unloading mechanism for retracting the carriage arm from a position on the magnetic disk, and a shroud forming a peripheral wall; wherein the rotating direction of the magnetic disk is the same as a direction from the free end of the carriage arm toward the base end of the same.

BRIEF DESCRIPTION OF THE DRAWINGS

The invention disclosed herein will be understood better with reference to the following drawings of which.

DESCRIPTION OF THE PREFERRED EMBODIMENTS

Preferred embodiments of the present invention will be described by way of example with reference to the accompanying drawings.

First Embodiment

Figure 1:
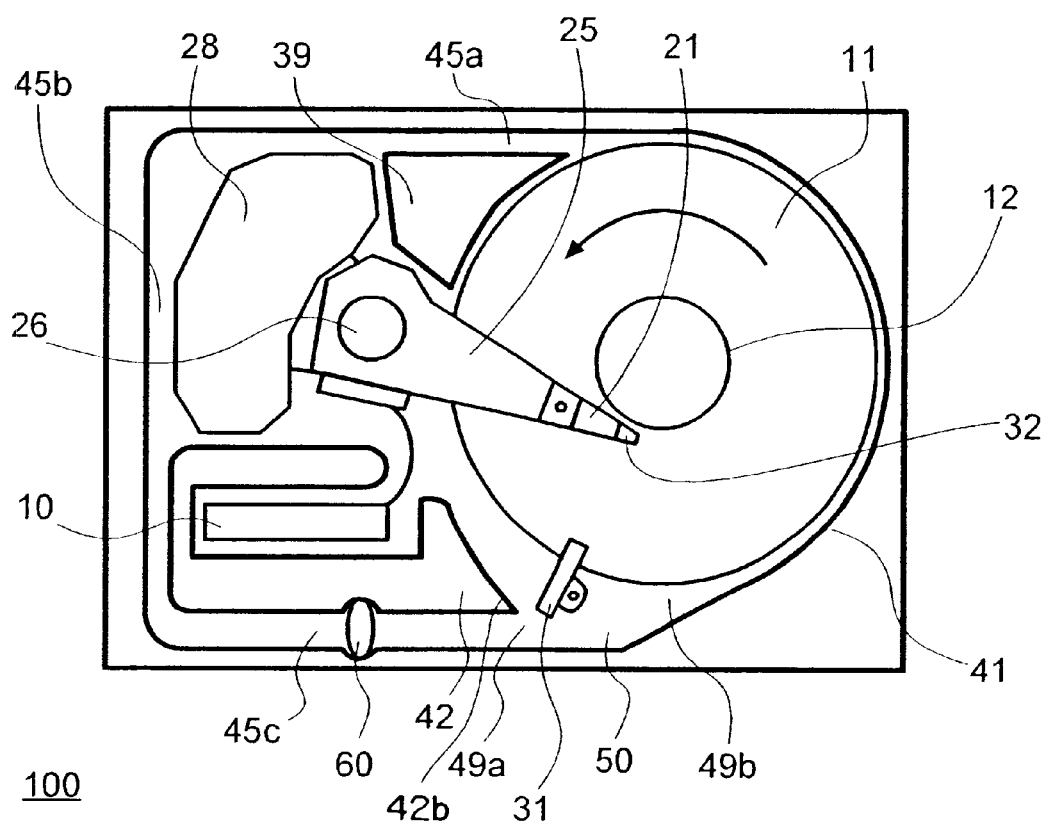
FIG. 1 is a schematic plan view of a magnetic disk device representing a first embodiment according to the present invention.

Referring to FIG. 1, which shows a magnetic disk device 100 representing a first embodiment according to the present invention, a magnetic disk 11 is driven for rotation by a spindle motor 12. A magnetic head for writing information to and reading information from the magnetic disk 11 is supported on the extremity of a suspension 21 supported on a carriage arm 25. The carriage arm 25 is capable of turning on a pivot shaft 26. A voice coil motor 28 drives the carriage arm 25 for turning. The rotating direction of the magnetic disk 11 is the same as a direction from the base end of the suspension 21 toward the extremity of the same. A connector 10 connects input and output signal lines, not shown, extending from the magnetic head supported on the suspension 21 to a control circuit, not shown, which is included in the magnetic disk device 100. A loading/unloading mechanism 31 in the form of a lumped loading system is disposed so that a tab 32 slides onto the loading/unloading mechanism 31 when the carriage arm 25 is turned to a position outside the magnetic disk 11.

A shroud 41 has a wall surrounding the magnetic disk 11. The shroud 41 and a land 39 form return channels 45a, 45b and 45c, i.e., air passages, through which air currents produced when the magnetic disk 11 is rotated flow. A filter 60 for removing dust is placed in the return channel 45c. The return channel 45c is connected to an air passage 50 defined by an extension 42. Air currents produced when the magnetic disk 11 is rotated flow into the return channel 45a, flow through the return channels 45b and 45c and the air passage 50, and flow outside through an exit 49 formed at a position below the loading/unloading mechanism 31 with respect to the direction of flow of the air currents. The air currents flow also through a space immediately above the loading/unloading mechanism 31 into the air passage 50 and flow outside through the exit 49b.

In the magnetic disk device 100, spaces on the upper and the lower side of the loading/unloading mechanism 31 are connected by the air passage 50, and a screen 42b screens a principal section of the air passage 50 from the magnetic disk 11 so that air flows smoothly downstream to prevent the production of turbulent air currents around the loading/unloading mechanism. Thus, enhancement of windage vibrations of the magnetic head due to turbulent air currents can be prevented and the reliability of the magnetic disk device can be enhanced.

The fluttering amplitude of the magnetic disk 11 on the magnetic disk device 100 provided with the filter 60 in the return channel 45b or 45c was smaller by about 27% than that of a magnetic disk on a conventional magnetic disk device provided with an air passage specially for a filter.

The effect of placing the filter in the return channel in reducing the fluttering amplitude of the magnetic disk 11 is effective not only in magnetic disk devices provided with a loading/unloading mechanism, but also in magnetic disk devices of a CSS (contact start stop) system in which a magnetic head is in sliding contact at the start and stop of rotation of the magnetic disk.

The filter 60 may be placed in the return channel 45a or 45b. Experiments proved that flutter reduction when the filter 60 is placed at the inlet of the return channel 45a was greater by about 10% than those when the filter 60 was placed at other positions. The effect of air on cooling the voice coil motor 28 can be enhanced by placing the filter 60 in the return channel 45b between the voice coil motor 28 and the shroud 41.

Second Embodiment

Figure 2:
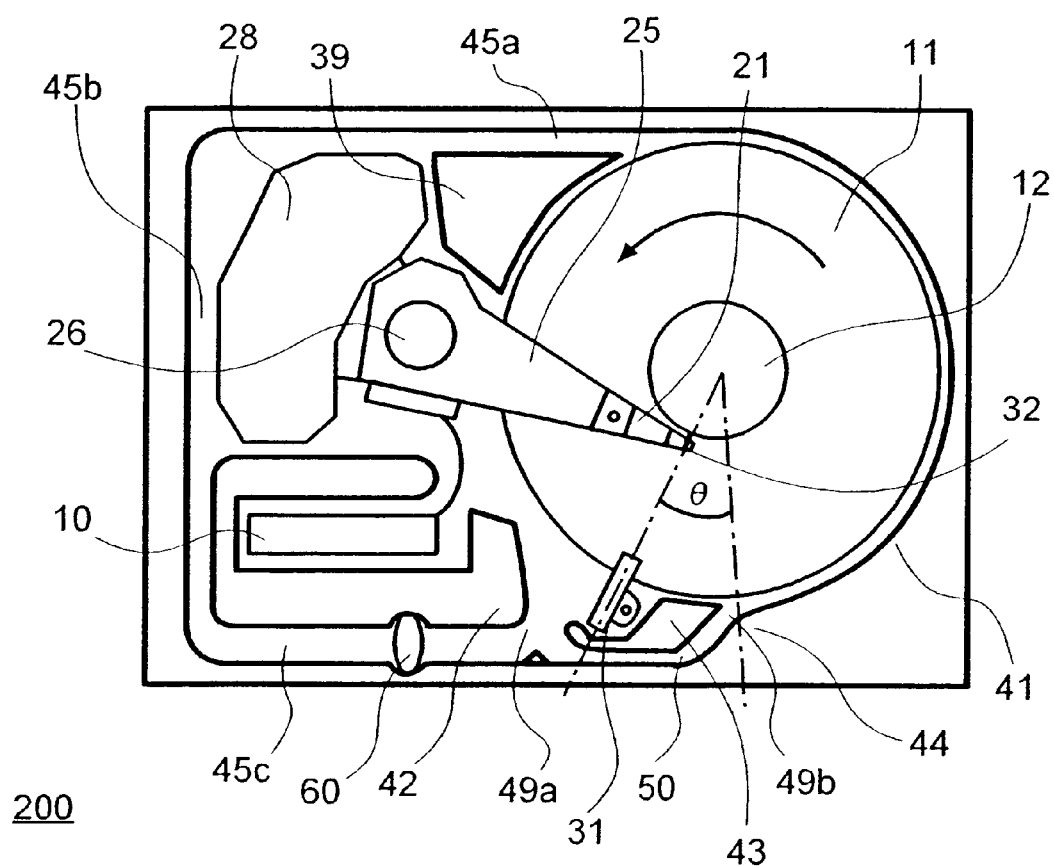
FIG. 2 is a schematic plan view of a magnetic disk device representing a second embodiment according to the present invention.

A magnetic disk device 200 representing a second embodiment according to the present invention will be described with reference to FIG. 2, in which parts like or corresponding to those of the magnetic disk device 100 in the first embodiment will be denoted by the same reference numerals and a respect of the description thereof will be omitted.

The magnetic disk device 200 is provided with a screen 43 to produce smooth air currents around a loading/unloading mechanism 31. The screen 43 covers a region on one side of the loading/unloading mechanism 31 spaced from the magnetic disk 11, i.e., on the opposite side of the mechanism 31 from the magnetic disk 11, and extends into a region on the lower side of the loading/unloading mechanism 31 with respect to the rotating direction of the magnetic disk 11. A portion 44 of a shroud 41 is shaped so that the width of the air passage 50 decreases gradually.

The air passage 50 is defined by a portion of the screen 43 on the lower side of the loading/unloading mechanism 31 with respect to the direction of air flow, and the shroud 41. Air flows through an entrance 49a into the air passage 50 and flows outside the air passage 50 through an exit 49b. The screen 43 is shaped so as to guide air so that air flows smoothly and screens a principal section of the air passage 50 from the magnetic disk 11. The exit 49b is located on a line passing through the center of the magnetic disk 11 and at an angle θ about the center of the magnetic disk 11 measured in the rotating direction of the magnetic disk 11 from a line passing through the center of the magnetic disk 11 and the loading/unloading mechanism 31 (head stroke position). Preferably, the angle θ is in the range of 10° to 30°, more preferably, in the range of 15° to 25°. Turbulent flow of air is produced unavoidably in the vicinity of the exit 49b, and, if the angle θ is below 10°, the exit 49b will be excessively near to the loading/unloading mechanism 31 and turbulent flow of air produced at the exit 49b will adversely affect the function of the loading/unloading mechanism 31. Consequently, the turbulence control effect of the magnetic disk device will be unsatisfactory. When the angle θ is greater than 300°, the shroud 41 is excessively short and the exciting force that causes the magnetic disk 11 to flutter increases.

In the magnetic disk device 200 in the second embodiment, the screen 43 covers the region on one side of the loading/unloading mechanism 31 spaced from the magnetic disk 11 and extends into the region on the lower side of the loading/unloading mechanism 31 with respect to the rotating direction of the magnetic disk 11. Therefore, the production of turbulent flow of air by the irregular shape of the loading/unloading mechanism 31 can be prevented and air is able to flow smoothly.

Since the air currents produced by the rotating magnetic disk 11 flow in a direction opposite the rotating direction of the magnetic disk 11 with respect to the loading/unloading mechanism 31, the collision of the air currents against the loading/unloading mechanism 31 and the resultant turbulent flow of air can be prevented. Thus, it is possible to prevent the deterioration of the reliability of the magnetic disk device 200 caused by the enhancement of windage vibrations of the magnetic head by the loading/unloading mechanism 31, the enhancement of exciting force that causes the magnetic disk 11 to flutter, and the unstable loading and unloading operations due to the adverse effect of turbulent flow on the suspension 21 and the carriage arm 25.

Third Embodiment

Figure 3:
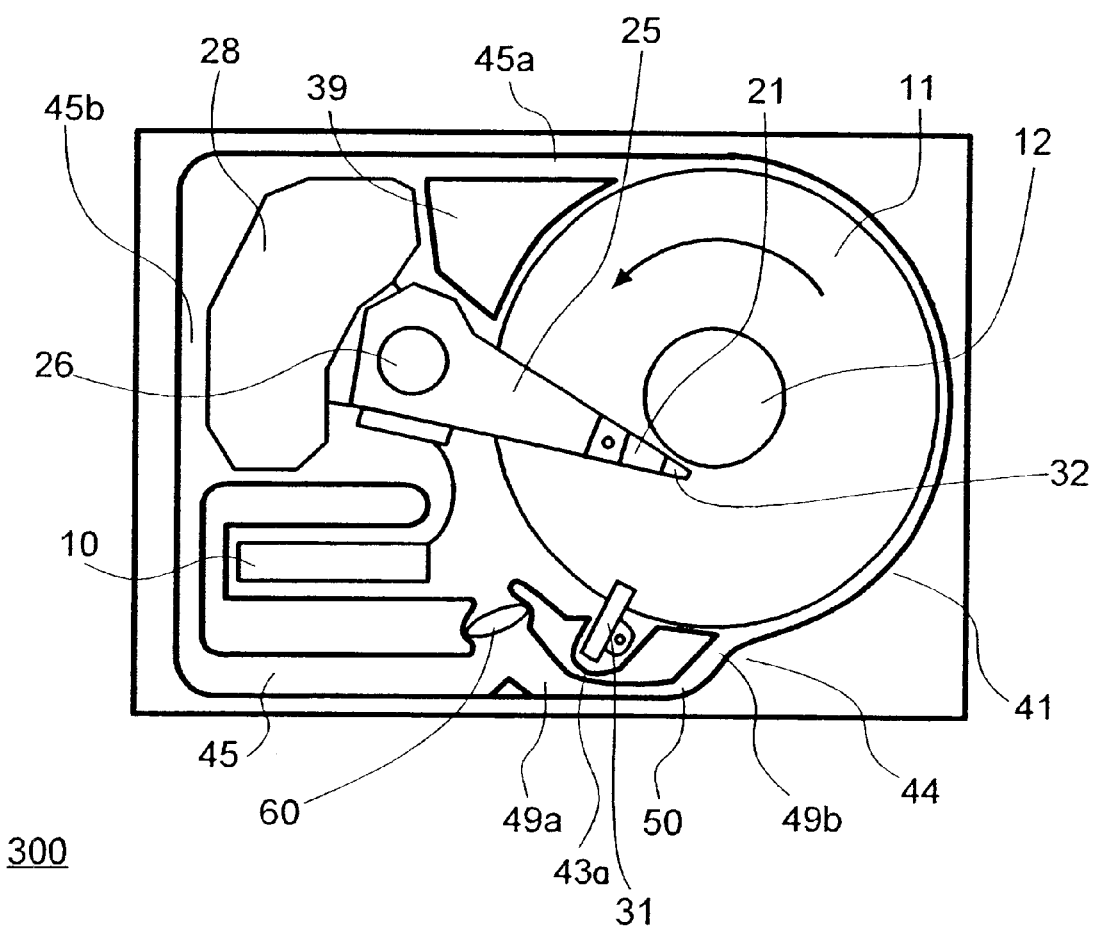
FIG. 3 is a schematic plan view of a magnetic disk device representing a third embodiment according to the present invention.

A magnetic disk device 300 representing a third embodiment according to the present invention will be described with reference to FIG. 3, in which parts like or corresponding to those of the magnetic disk devices 100 and 200 in the first and the second embodiment will be denoted by the same reference numerals, and a repeated description thereof will be omitted.

The magnetic disk device 300 is basically the same in construction as the magnetic disk device 200 in the second embodiment. The magnetic disk device 300 is provided with a screen 43a that extends from the upper side to the lower side of a loading/unloading mechanism 31 to guide air currents more smoothly from the upper side of the loading/unloading mechanism 31 into an air passage 50. A filter 60 is placed in a passage between an extension 42 and the screen 43a.

In the magnetic disk device 300 in the third embodiment, the stability of air currents flowing from the upper side toward the lower side of the loading/unloading mechanism 31 can be enhanced because the screen 43a extends from the upper side to the lower side of the loading/unloading mechanism 31. Experiments show that the screen 43a increases flutter reducing effect by about 10%. The filter 60, similarly to that of the first or the second embodiment, may be disposed in the return channel 45a or 45b.

Fourth Embodiment

Figure 4:
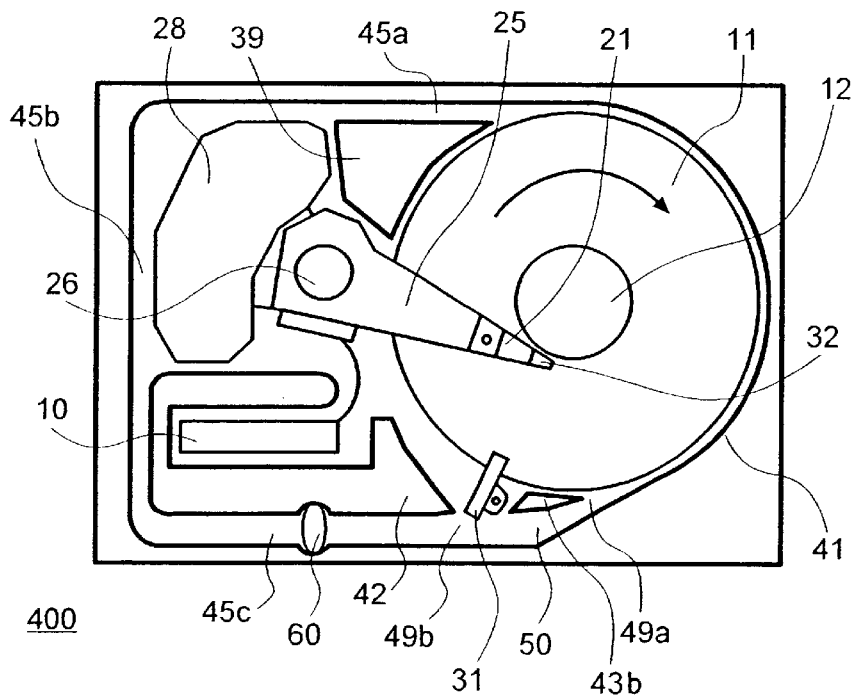
FIG. 4 is a schematic plan view of a magnetic disk device representing a fourth embodiment according to the present invention.

A magnetic disk device 400 representing a fourth embodiment according to the present invention will be described with reference to FIG. 4, in which parts like or corresponding to those of the magnetic disk devices 100, 200 and 300 in the first, the second and the third embodiment will be denoted by the same reference numerals, and a repeated description thereof will be omitted.

This magnetic disk device 400 drives a magnetic disk 11 by way of a spindle motor 12. The magnetic disk 11 is rotated in a direction opposite the direction in which the magnetic disks 11 in the first to the third embodiments are rotated; that is, the magnetic disk 11 is rotated in a direction from a loading/unloading mechanism 31 toward a suspension 21, in a direction from the extremity toward the base end of the suspension 21 or in a direction from a magnetic head toward a carriage arm 25 supporting the suspension 21.

In a magnetic disk device of a CSS system, the magnetic disk cannot be turned in the reverse direction because troubles, such as buckling, occur in the gimbals and the suspension of the magnetic disk device when the magnetic disk is rotated in the reverse direction. The magnetic disk device provided with the loading/unloading mechanism 31 is free from such troubles even if the magnetic disk is rotated in the reverse direction.

A shroud 41 and a land 39 define return channels 45a, 45b and 45c through which air currents produced by a rotating magnetic disk 11 flow. A filter 60 is placed in the return channel 45c to filter out dust from the air. An extension 42 connects the return channel 45c to an air passage 50. The filter 60, similarly to that of the first or the second embodiment, may be placed in the return channel 45a or 45b.

The air passage 50 is defined by a screen 43b disposed on the upper side of the loading/unloading mechanism 31. Air flows through an entrance 49a on the upper side of the loading/unloading mechanism 31 into the air passage 50 and flows out of the air passage 50 through an exit 49b on the lower side of the loading/unloading mechanism 31. The screen 43b is shaped so as to guide air so that air flows smoothly, and screens a principal section of the air passage 50 from the magnetic disk 11. The screen 43b is extended on the upper side of the loading/unloading mechanism 31 with respect to the direction of air flow. Air currents produced by the rotating magnetic disk 11 flow through the entrance 49a into the air passage 50, flow out of the air passage 50 through the exit 49b and flow through the return channels 45c, 45b and 45a.

Figure 5:
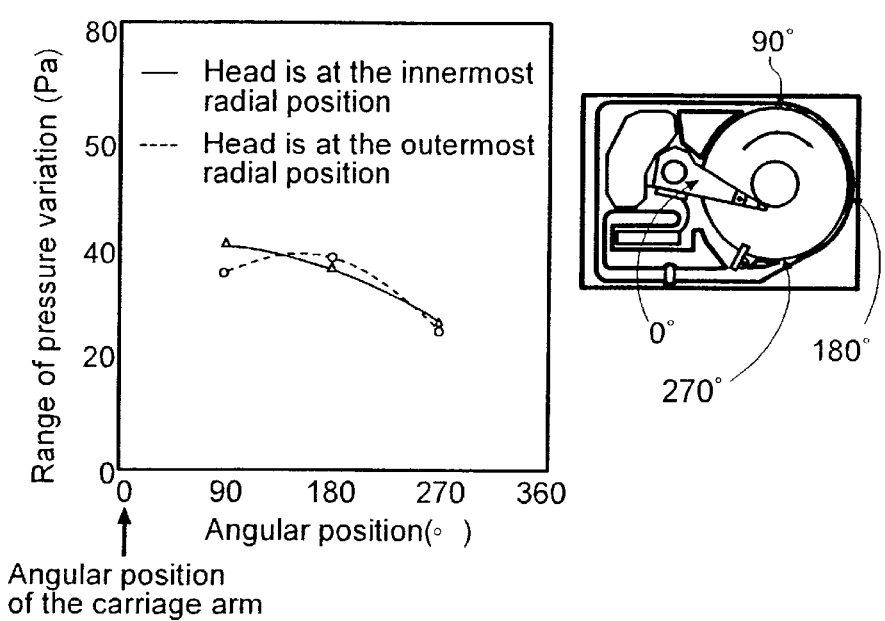
FIG. 5 is a graph showing the results of experiments on pressure variation.
Figure 6:
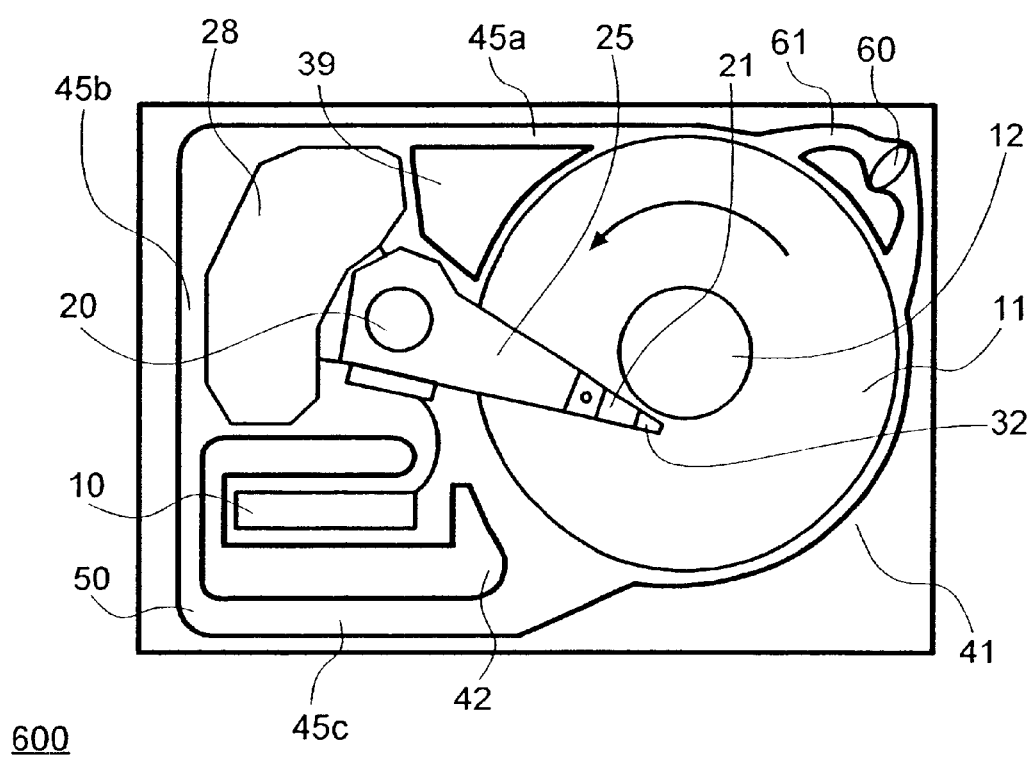
FIG. 6 is a plan view of a prior art magnetic disk device.

FIG. 5 shows measured ranges of pressure variation at positions at angles 90°, 180° and 270° in the rotating direction of the magnetic disk 11 from a reference line at an angular position of 0° corresponding to the position of the carriage arm 25. As obvious from FIG. 5, the range of pressure variation decreases with the angle from the reference line. When the magnetic disk 11 is rotated in the direction indicated by the arrow in FIG. 4, the range of pressure variation is the widest in a region between the carriage arm 25 and the exit of the return channel 45a, extending under an open section of the shroud 41, i.e., a section between the entrance 49a of the passage defined by the shroud 41 and the magnetic disk 11 and a position where the passage defined by the land 39 and the magnetic disk 11 is narrowed. The range of pressure variation is the narrowest in a region around the entrance 49a on the upper side of the open section of the shroud 41.

Since the head 11 of the magnetic disk device 400 in the fourth embodiment is located at an angular position corresponding to the region around the entrance 49a on the upper side of the open section of the shroud 41, where the range of pressure variation is the narrowest, the windage vibrations of the head 11 can be prevented, thereby to enhance the reliability of the magnetic disk device 400.

The mode of variation of the range of pressure variation in a magnetic disk device not provided with any return channels is the same as that shown in FIG. 5. The effect of the magnetic disk device 400 in the fourth embodiment can be attained also in a magnetic disk device not provided with any return channels.

As apparent from the foregoing description, the magnetic disk device according to the present invention is capable of reducing windage vibrations of the head caused by air currents generated by the rotating magnetic disk, which enhances the reliability of the magnetic disk device.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A magnetic disk device comprising:

a magnetic disk for recording information;

a spindle motor for driving the magnetic disk for rotation;

a magnetic head for writing information to and reading information from the magnetic disk;

a carriage arm supporting the magnetic head;

a voice coil motor for moving the carriage arm;

a loading/unloading mechanism for retracting the carriage arm from a position on the magnetic disk;

a shroud forming a peripheral wall; and a structure forming an air passage extending through a clearance between the voice coil motor and the shroud between a position on an upper side of the carriage arm with respect to a direction of rotation of the magnetic disk and a position on a lower side of the carriage arm with respect to the direction of rotation of the magnetic disk;

wherein one end of the air passage is located on a line passing the center of the magnetic disk and at an angle in the range of 10° to 30° about the center of the magnetic disk measured in the rotating direction of the magnetic disk from a line passing the loading/unloading mechanism and the center of the magnetic disk.

2. The magnetic disk device according to claim 1 further comprising a screen extending along the magnetic disk in a region on an upper side of the loading/unloading mechanism with respect to the direction of rotation of the magnetic disk and/or a region on a lower side of the loading/unloading mechanism with respect to the direction of rotation of the magnetic disk.

3. The magnetic disk device according to claim 1 further comprising an air filter placed in the air passage to clean air inside of the disk device.

4. The magnetic disk device according to claim 1, wherein a direction of rotation of the magnetic disk is the same as a direction from a portion of the carriage arm supporting the magnetic head toward a base end of the carriage arm.

5. A magnetic disk device comprising:

a magnetic disk for recording information; a spindle motor for driving the magnetic disk for rotation;

a magnetic head for writing information to and reading information from the magnetic disk;

a carriage arm supporting the magnetic head;

a voice coil motor for moving the carriage arm;

a loading/unloading mechanism for retracting the carriage arm from a position on the magnetic disk;

a shroud forming a peripheral wall; and a structure forming an air passage extending through a clearance between the voice coil motor and the shroud between a position on an upper side of the carriage arm with respect to a direction of rotation of the magnetic disk and a position on a lower side of the loading/unloading mechanism with respect to the direction of rotation of the magnetic disk;

wherein one end of the air passage is located on a line passing the center of the magnetic disk and at an angle in the range of 10° to 30° about the center of the magnetic disk measured in the rotating direction of the magnetic disk from a line passing the loading/unloading mechanism and the center of the magnetic disk.

6. The magnetic disk device according to claim 5 further comprising a screen extending along the magnetic disk in a region on an upper side of the loading/unloading mechanism with respect to the direction of rotation of the magnetic disk and/or a region on a lower side of the loading/unloading mechanism with respect to the direction of rotation of the magnetic disk.

7. The magnetic disk device according to claim 5 further comprising an air filter placed in the air passage to clean air inside of the disk device.

8. The magnetic disk device according to claim 5, wherein a direction of rotation of the magnetic disk is the same as a direction from a portion of the carriage arm supporting the magnetic head toward a base end of the carriage arm.

* * * * *